July 3, 1923.
J. F. W. DIEGEL
AUTOMOBILE SIGNAL
Filed Aug. 7, 1922
1,460,709
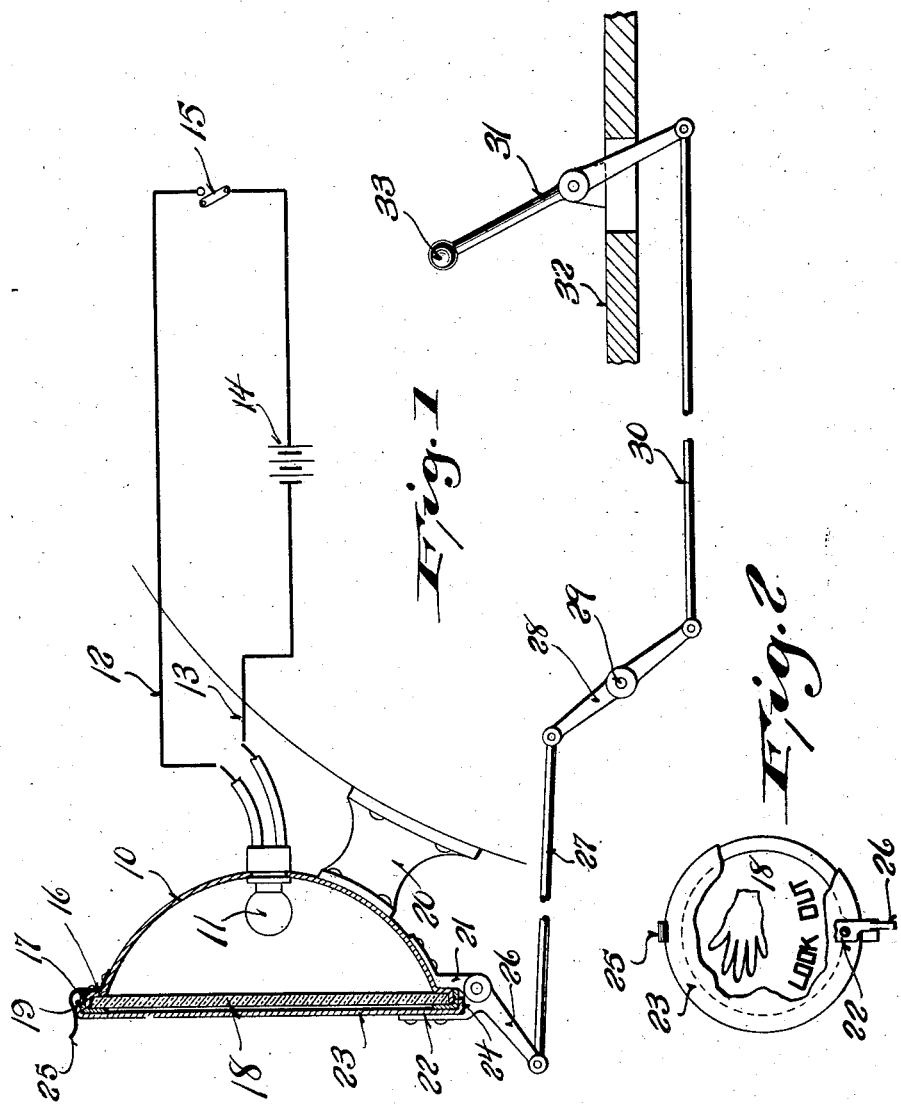

Patented July 3, 1923.

1,460,709

UNITED STATES PATENT OFFICE.

JOHN F. WILLIAM DIEGEL, OF MANITOWOC, WISCONSIN.

AUTOMOBILE SIGNAL.

Application filed August 7, 1922. Serial No. 580,251.

*To all whom it may concern:*

Be it known that I, JOHN FRITZ WILLIAM DIEGEL, a citizen of the United States, and resident of Manitowoc, in the county of Manitowoc and State of Wisconsin, have invented certain new and useful Improvements in Automobile Signals; and I do hereby declare that the following is a full, clear, and exact description thereof.

The invention relates to automobile signals adapted to be affixed to the rear of a car for signaling a warning to a following machine.

It comprises a glass which may be illuminated, a lamp which carries a suitable warning, and a cover pivoted adjacent the glass and adapted to be swung by the driver to reveal the glass.

The object of the invention is the provision of means for signaling a warning to drivers when the car carrying the device is stopping or slowing up, or about to turn.

An advantageous feature is the provision of a signal which is operative in the daytime and at night, and which need not be illuminated in the daytime, whereby a saving of current results. The signal is conveniently operable, a lever being disposed within reach of the driver.

An object of the invention is the provision of means for retaining the cover in position over the glass and to prevent the rattle of the same when the machine is vibrated by irregularities of the road. This consists of a retaining spring which is readily adapted to release the cover so that no resistance is offered to the movement of the lever by the driver.

With the above and other objects in view, which will appear as the description proceeds, my invention resides in the novel construction, combination and arrangement of parts substantially as hereinafter described and more particularly defined by the appended claim, it being understood that such changes in the precise embodiment of the herein disclosed invention may be made as come within the scope of the claim.

In the accompanying drawing, I have illustrated one complete example of the physical embodiment of the present invention constructed according to the best mode I have so far devised for the practical application of the principles thereof, and in which:

Figure 1 is a side elevation somewhat diagrammatic, showing parts in section.

Figure 2 is a rear view of parts showing the cover broken away revealing the glass.

A semi-spherical reflector 10 has a lamp 11 secured thereto, from which wires 12 and 13 lead to a battery 14 controllable by switch 15. The reflector is provided with an annular deformation 16, from which flange 17 is downwardly directed. Glass 18 is positioned against the deformation and enveloped by the flange. An angular ring 19 rests on the flange and projects over the glass, retaining it securely in position. On the glass a hand and the words "Look out" are inscribed in such a manner as to make them visible at night on the illumination of lamp 11, preferably painted red. These signals are also of such character as to be visible in the daytime.

Support 20 is secured to the reflector at the back thereof and the support is affixed to a fender, or at any desired place in the rear of the car. A bracket 21 is made rigid with the lower end of housing 10 and pivotally supports a lever, one arm 22 of which is riveted to a cover 23 which has an inwardly directed flange 24 adapted to envelope ring 19. When the lever is swung downwardly, whether at day or night, the signal is revealed. When the cover is in position shown in Figure 1, it is retained against movement by a spring which is secured to reflector 10 and is provided with a curved arm 25 which prevents accidental outward movement of the cover and eliminates jarring thereof, but permits it to be lowered on the application of force to arm 26 of the lever.

Arm 26 is pivoted to link 27, pivoted to lever 28, rotating at 20 and pivoted to rod 30, pivoted to hand lever 31 pivotally supported about floor 32, or at any suitable place.

Hand lever 31 is provided with a knob 33 and affords a convenient means for swinging the cover. The lowering of the cover operates to warn a driver of a following car of the stopping, slowing up, or turning of the car on which the signal is located.

The signal is operable in a short period of time. On the initial movement of lever 31, cover 23 is swung slightly out from closed position and at this moment the signal becomes operative as light is emitted, being directed upwardly. The slight angular movement of the cover produces an opening that widens gradually from the bottom, so that the light flares upwardly giving a warning to following motorists. On a further movement, a symbol on glass 18 is revealed, conveying a warning. Still further movement of the cover results in the display of words of warning carried by the glass below the symbol. Thus the signal is operative from the very moment of initiation of movement by hand lever 31, and progresses thereafter, there being three distinct signalling stages.

I claim:—

The combination of a reflector, a lamp therein, a glass plate carried by said reflector, a cover normally overlying said glass plate and pivoted to the lower end of said reflector, said plate having a visible symbol exhibited on its upper portion, and words of warning below said symbol, and an arm rigid with said cover actuable to rotate said cover, whereby said cover may be moved outwardly slightly to permit the upward emission of light, and further outward to exhibit said visible symbol and still further to reveal said words of warning.

In testimony that I claim the foregoing I have hereunto set my hand at Manitowoc, in the county of Manitowoc and State of Wisconsin.

J. F. WILLIAM DIEGEL.